United States Patent [19]

Matzner et al.

[11] Patent Number: 4,748,227

[45] Date of Patent: May 31, 1988

[54] PROCESS FOR PREPARING POLY(ARYL ETHER)KETONES USING A SODIUM CARBONATE/ORGANIC ACID SALT CATALYST

[75] Inventors: Markus Matzner, Edison; Paul A. Winslow, West Millington, both of N.J.

[73] Assignee: Amoco Corporation, Chicago, Ill.

[21] Appl. No.: 855,596

[22] Filed: Apr. 25, 1986

[51] Int. Cl.$^4$ .............................................. C08G 8/02
[52] U.S. Cl. .................................... 528/126; 528/125
[58] Field of Search .......................................... 528/126

[56] References Cited

U.S. PATENT DOCUMENTS 4,176,222  11/1979  Cinderey .............................. 528/126
4,636,557  1/1987  Deckers .............................. 528/125
4,638,044  1/1987  Kelsey ................................. 528/125

Primary Examiner—John Kight
Assistant Examiner—Fred Krass
Attorney, Agent, or Firm—Donald M. Papuga; William H. Magidson; Ralph C. Medhurst

[57] ABSTRACT

Described herein is a novel process for the preparation of poly(aryl ether ketones). The process comprises reacting an activated dihalobenzenoid compound with a diphenol and/or in self-condensing a halophenol whose halogen atom is activated towards nucleophilic substitution reactions. The polymerizations are performed at high temperatures, in an aprotic solvent, and in the presence of a base. The base comprises sodium carbonate or bicarbonate and a potassium, rubidium or cesium salt of an organic acid.

22 Claims, No Drawings

PROCESS FOR PREPARING POLY(ARYL ETHER)KETONES USING A SODIUM CARBONATE/ORGANIC ACID SALT CATALYST

FIELD OF THE INVENTION

A novel process for the preparation of poly(aryl ether ketones) is described. The process comprises reacting an activated dihalobenzenoid compound with a diphenol and/or in self-condensing a halophenol whose halogen atom is activated towards nucleophilic substitution reactions. The polymerizations are performed at high temperatures, in an aprotic solvent, and in the presence of a base. The base comprises sodium carbonate or bicarbonate and a potassium, rubidium or cesium salt of an organic acid. The process yields high molecular weight, linear, poly(aryl ether ketones) possessing excellent thermal stability and physical properties. It is remarkable that the reactions proceed at rates that are significantly higher than those of the prior art processes. Moreover, the polymers obtained are substantially free of undesirable gel particles.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (viz. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, vol. 5, 1967, pp. 2415-2427, Johnson et al., U.S. Pat. Nos. 4,108,837 and 4,175,175. Johnson et al. show that a very broad range of PAE's can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Attwood et al., Polymer, 1981, vol 22, August pp. 1096-1103; Blundell et al., Polymer, 1983 vol. 24, August pp. 953-958, Attwood et al., Polymer Preprints, 20, no. 1, April 1979, pp. 191-194; and Rueda et al., Polymer Communications, 1983, vol. 24, September pp. 258-260. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the phenylene units in the structure are assumed.

Thus PAEKs are well known; they can be synthesized from a variety of starting materials; and they can be made with different melting temperatures and molecular weights. Most of the PAEKs are crystalline and at sufficiently high molecular weights they are tough, i.e., they exhibit high values ($>50$ ft-lbs/in$^3$) in the tensile impact test (ASTM D-1822). They have potential for a wide variety of uses, and their favorable properties class them with the best of the engineering polymers.

Some PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes tend to be brittle and thermally unstable. In contrast PAEK's made by nucleophilic aromatic substitution reactions are tough crystalline polymers. Nucleophilic aromatic substitution reactions for producing PAEK's are described in the following references:

Canadian Pat. No. 847963 describes a process for preparing polyarylene polyethers. The process comprises contacting equimolar amounts of a dihydric phenol and a dihalobenzenoid compound and at least one mole of an alkali metal carbonate per mole of dihydric phenol. The dihydric phenol is in situ reacted with the alkali metal carbonate to form the alkali metal salt thereof and the formed salt reacts with the dihalobenzenoid compound to form the polyarylene polyether in the usual fashion.

U.S. Pat. No. 4,176,222 describes the preparation of aromatic polyethers containing $SO_2$ and/or CO linkages by a nucleophilic reaction utilizing a mixture of sodium carbonate or bicarbonate and a second alkali metal carbonate or bicarbonate. The alkali metal of the second alkali metal carbonate or bicarbonate has a higher atomic number than that of sodium. The second alkali metal carbonate or bicarbonate is used in amounts such that there are 0.001 to 0.2 gram atoms of the alkali metal of higher atomic number per gram atom of sodium. The process is stated to take place faster when the combination of sodium carbonate or bicarbonate and the second alkali metal carbonate or bicarbonate are used. Also the products are stated to be of high molecular weight using such a combination.

The patent describes in Example 17 that when the reaction is carried out using only sodium carbonate, a polymer is obtained having a reduced viscosity of 0.60 dl/g as measured in concentrated sulfuric acid at 25° C. at a concentration of 1 gm/100 ml. However, it is stated in the patent that when the polymer was compression molded into a film, the film was brittle and dark grey in color. In Example 18 of the patent, the polymerization was carried out using potassium carbonate instead of sodium carbonate and a high molecular weight polymer was produced (reduced viscosity of 1.55 as measured in concentrated sulfuric acid at 25° C. at a concentration of 1 gm/100 ml). However, the polymer was stated to contain a quantity of gel and also, the reaction vessel had acquired a black coating. In Example 19 of the patent, a mixture of potassium carbonate and sodium carbonate was used. The patent stated that the polymer produced had a high reduced viscosity and a tough off-white film was formed from it. Also, no gel was present in the polymer and the reaction vessel had not become discolored.

U.S. Pat. No. 4,320,224 also describes the production of aromatic polyetherketones in the presence of an alkali metal carbonate or bicarbonate in an amount providing at least 2 gram atoms of alkali metal per mole of starting bisphenol. The patent states that the sole use of sodium carbonate and/or bicarbonate is excluded.

U.S. Pat. No. 3,941,748 describes the use of alkali metal fluoride for preparing polyarylethers. The process requires that sufficient fluoride be present so that the total fluoride available (including that from any fluoroaryl monomers) be at least twice the number of phenol (—OH) groups. The examples show it to be, in general, a slow process. It is not one which is suitable per se for making PAEKs, see Control E, infra.

Imai, et al in *Makromol Chem.*, 179,2989-2991, 1978 describe the preparation of polysulfones in dipolar aprotic solvents using at least 500 mole % of potassium fluoride based on the bisphenol. The process uses relatively low temperatures (about 100° C.) to avoid polymer degradation but requires very long reaction times (48–70 hours).

U.S. Pat. No. 4,169,178 refers to the British counterpart of U.S. Pat. No. 3,941,748, i.e., British Pat. No. 1,348,630. The patent states that the amount of alkali metal carbonate required may be reduced in the preparation of aromatic polyethers by employing fluorophenols or difluorobenzenoid compounds as part or all of the halogen containing reactants. The patent states that the process gives faster reactions and higher molecular weights and less colored polymers than a process using potassium fluoride in place of potassium carbonate.

U.S. patent application, Ser. No. 713,845 filed on Mar.20, 1985 in the name of Donald R. Kelsey, titled "An Improved Process For Preparing Poly(Aryl Ether Ketone)s", commonly assigned, describes the use of sodium carbonate or bicarbonate and an alkali metal halide selected from potassium, rubidium, or cesium fluoride or chloride, or combinations thereof. This process represents a significant improvement over the prior art. It, however, still makes use of fluoride salts which are corrosive; moreover, the rates of polymerizations are relatively low. Higher more satisfactory rates are achieved at potassium, rubidium, or cesium concentrations such that the obtained polymers are often contaminated with undesirable gel particles which, in turn, have a deleterious effect on the physical properties of the poly(aryl ether ketone)s.

THE INVENTION

This invention is directed to a process for making various molecular weight poly(aryl ether ketone)s in comparatively shorter reaction times overall than by using a combination of sodium carbonate or bicarbonate and a second higher alkali metal carbonate or bicarbonate, or by using a mixture of sodium carbonate or bicarbonate and potassium, rubidium, or cesium floride or chloride, or combinations thereof.

Specifically, the invention is directed to an improved process for preparing poly(aryl ether ketone)s by the reaction of a mixture of at least one bisphenol and at least one dihalobenzenoid compound, and/or a halophenol, in which the improvement comprises providing to the reaction a combination of sodium carbonate and/or bicarbonate and a potassium, rubidium, or cesium salt of an organic acid or combinations of various organic salts thereof.

The process of this invention yields high molecular weight, linear, poly(aryl ether ketone)s possessing excellent thermal stability and physical properties. It is remarkable that the reactions proceed at rates that are significantly higher than those of the prior art processes. Moreover, the polymers obtained are relatively free of undesirable gel particles.

The poly(aryl ether ketone)s of this invention are characterized as including oligomers, polymers, and copolymers containing repeating units of ether oxygen and keto(carbonyl) interconnected by aromatic diradicals, such as 1,4-phenylene. They may be characterized more specifically by one or more of the following formulae:

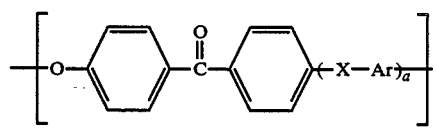

(I)

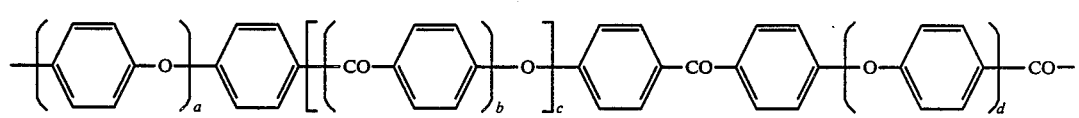

(II)

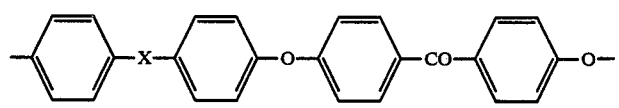

(III)

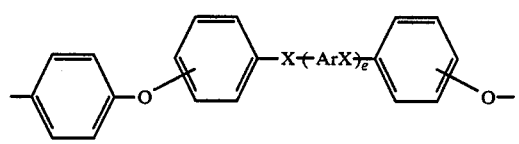

(IV)

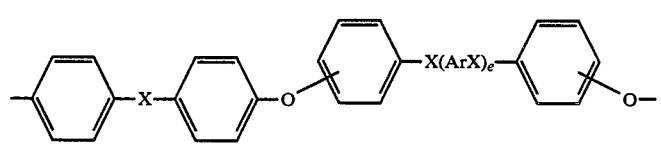

(V)

wherein Ar is independently a divalent aromatic radical selected from phenylene, biphenylene, or naphthalene, X is independently O, $$\overset{O}{\underset{C,}{\|}}$$
SO₂, or a direct bond and a is an integer of from 1 to 4, b, c, d and e are 0 to 1 and preferably d is 0 when b is 1.
Preferred poly(aryl ether ketones) include those having repeating units of the formula:
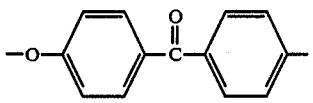
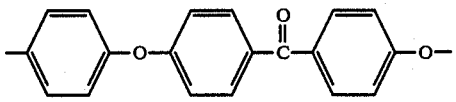
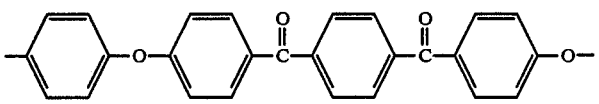
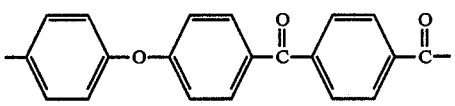
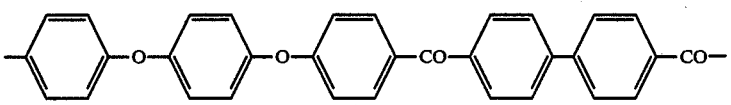
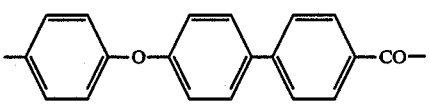
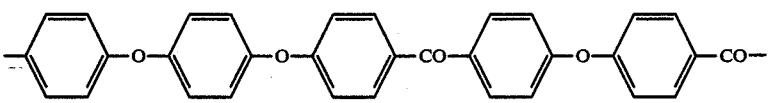
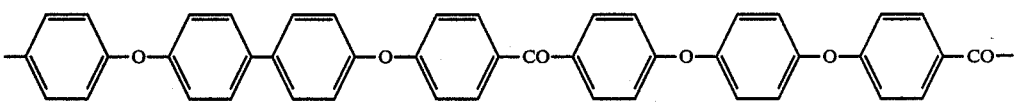
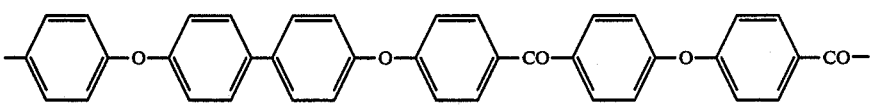
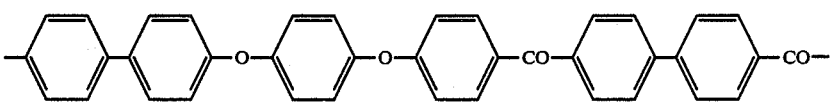
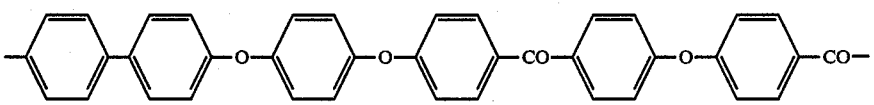
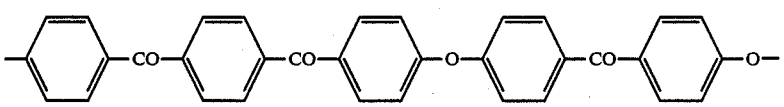
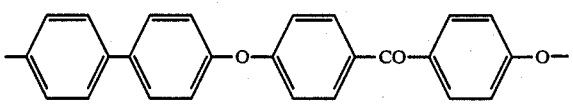

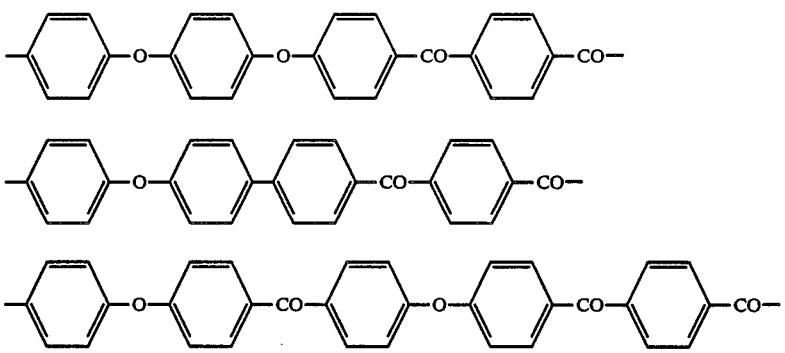

The preferred poly(aryl ether ketone)s may form copolymers with the following:

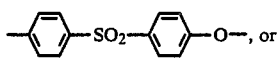

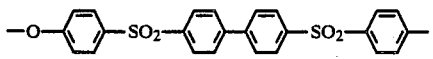

The process is conducted by reacting a mixture (substantially equimolar amounts when maximum molecular weight is sought) of at least one bisphenol and at least one dihalobenzenoid compound and/or a halophenol. The bisphenols may be depicted as follows:

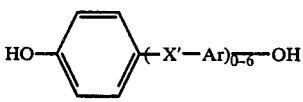

wherein X and X' are independently O,

$SO_2$, or a direct bond and Ar is independently a divalent radical selected from phenylene, biphenylene or naphthalene, most preferably 1,4-phenylene.

The dihalobenzenoid compound may be depicted as follows:

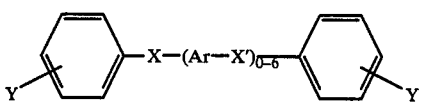

wherein Y is halogen, preferably fluorine or chlorine, the Y's may be the same or different and are ortho or para to the X; Ar, X, and X' are as defined above with the proviso that X or X' ortho or para to the Y's are electron withdrawing groups, i.e.,

or $SO_2$ In the preferred embodiment, each aromatic radical is para substituted and most preferably, 1,4-phenylene.

The halophenols may be depicted as follows:

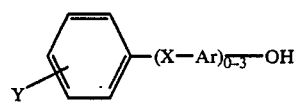

wherein Y, X, and Ar are as defined above with the proviso that the X ortho or para to Y is an electron withdrawing group, i.e.,

or $SO_2$. Preferred bisphenols in such a process include: hydroquinone,
4,4'-dihydroxybenzophenone,
4,4'-dihydroxybiphenyl,
4,4'-dihydroxydiphenyl ether,
4,4'-dihydroxydiphenyl sulfone, and
1,4-bis(p-hydroxybenzoyl)benzene
4,4'-bis(4-hydroxyphenylsulfonyl)biphenyl, Preferred dihalobenzenoid and halophenol compounds include:
4-(4-chlorobenzoyl)phenol,
4-(4-fluorobenzoyl)phenol,
4,4'-difluorobenzophenone,
4,4'-dichlorobenzophenone,
4-chloro-4'-fluorobenzophenone,
1,4-bis(4-fluorobenzoyl)benzene,
1,3-bis(4-fluorobenzoyl)benzene,
4,4'-dichlorodiphenyl sulfone, and
4,4'-difluorodiphenyl sulfone.

As indicated above the polymerizations are performed in the presence of a base which is composed of sodium carbonate or bicarbonate and of a potassium, rubidium, or cesium salt of an organic acid. Salts of any organic acid are useful. Thus, one may use the potassium, rubidium, or cesium salts of aliphatic linear or branched acids such as formic, acetic, propionic, butyric, isobutyric, pentanoic, hexanoic, heptanoic, octanoic, nonanoic, decanoic, 2-methyl-butyric, 3,4-dimethyl-pentanoic, 4,4-dimethyl hexanoic, 2-ethyl-heptanoic, 3-propyl-5,6-dimethyl nonanoic and other similar acids; salts of halo-substituted aliphatic acids such as monochloro-, dichloro-, and trichloroacetic, 2-chloropropionic, 3,5-dichloroheptanoic, bromoacetic, 3-fluorobutyric, and 3,3,3-trichloropropionic acids; salts of aromatic mono- or polynuclear acids such as benzoic, toluic, 3,4-dimethylbenzoic, 2-chlorobenzoic, 3,4- dichlorobenzoic, 2-bromobenzoic, 2-chloro-4-methylbenzoic, 2-fluoro-3-ethylbenzoic, other alkyl and/or halo-substituted benzoic acids, the naphthalene carboxylic acids, alkyl-substituted naphthalene carboxylic acids such as 3-methyl-naphthalene-1-carboxylic acid, 6-ethyl-naphthalene-2-carboxylic acid, halo-substituted naphthalene carboxylic acids such as 4-chloro-naphthalene-2-carboxylic acid, phenanthrene and anthracene carboxylic acids and the like;

salts of araliphatic acids such as phenylacetic, diphenyl acetic, 1-naphthyl acetic, 2-naphthyl-acetic, 4-chlorophenyl acetic, 4-methylphenyl acetic, 3-bromo-1-naphthyl acetic, 4-chloro-2-naphthyl-acetic, 3-(6-chloro-1-naphthyl)propionic, 3-(4-ethylphenyl)butyric, 3-methyl-4-(2-ethyl-4-chlorophenyl)butyric, 3-phenyl-hexanoic, and 7-phenylnonanoic acids;

salts of heterocyclic carboxylic acids such as furane-2-carboxylic, furane-3- carboxylic, thiophene-2-carboxylic, thiophene-3-carboxylic, the pyridine, quinoline and isoquinoline carboxylic acids; salts of alkyl, aryl, and halo-substituted heterocyclic acids such as 2-methylfurane-3-carboxylic, 4-chloro-pyridine-2-carboxylic, 2-methyl-4-oxazole carboxylic and 2-propyl-pyrazine-3 carboxylic acids;

salts of dicarboxylic acids such as oxalic, malonic, succinic, adipic, suberic, azelaic, $\alpha$-bromo-glutaric, $\beta$, $\beta'$-dimethyl-glutaric, $\alpha$, $\alpha'$-dichlorosuberic, maleic and fumaric acids; salts of aromatic and heterocyclic dicarboxylic acids such as phthalic, isophthalic, terephthalic, naphthalene-1,2-dicarboxylic, naphthalene-2,3-dicarboxylic, naphthalene-1,5; 1-6; 1,7; 1,8; 2,4; 2,5; and 2,6-dicarboxylic, pyridine-2,3-dicarboxylic, furane-2,3-dicarboxylic acids and the like;

salts of aliphatic, aromatic, and heterocyclic sulfonic and sulfinic acids such as methane sulfonic, ethane sulfonic, propane sulfonic, benzene sulfonic, benzene sulfinic, 1-naphthalene sulfonic, 2-naphthalene sulfonic, 1-naphthalene sulfinic, 1,8-naphthalene disulfonic, 2,6-naphthalene disulfonic, 4-methyl-benzene sulfinic, p-toluene sulfonic, 3,4-dichloro-benzene sulfonic, 6-chloro-naphthalene-1-sulfonic, quinoline-2- sulfonic, 4-pyridine sulfonic, 2-thiophene sulfonic, 3-thiophene sulfonic, 3-methyl-2-furane sulfinic, 3-propyl-2-furane-sulfonic acids and the like;

salts of aliphatic, aromatic, and heterocyclic phosphonic and phosphinic acids such as methane phosphonic, ethane phosphonic, benzene phosphinic, benzene phosphonic, 1-naphthalene phosphonic, 2-naphthalene-phosphonic, 1-naphthalene-phosphinic, 1,8-naphthalene diphosphonic, 2,6-naphthalene diphosphonic, 4-methyl-benzene phosphinic, 4-ethyl-benzene phosphonic, 3,4-dichloro-benzene phosphonic, 3,4-dibromobenzene phosphonic, 3-chloro-4-methyl benzene phosphonic, 6-chloro-1-naphthalene phosphonic, 2-quinoline-phosphonic, 2-thiophene phosphonic, 3-thiophene phosphonic, 3-thiophene phosphinic, 3-chloro-2-furane phosphinic, 3-propyl-2-furane phosphonic acids and the like.

Mixed salts such as for example mixtures of potassium and rubidium acetates or mixtures of potassium acetate and potassium benzene sulfonate, and the like can also be used. The preferred salts are potassium formate, acetate, propionate, oxalate, benzoate, benzene sulfonate acid p-toluene sulfonate.

The reaction is carried out by heating a mixture of one or more bisphenols and one or more dihalobenzenoid compounds or halophenols at a temperature of from about 100° to about 400° C. The reaction is conducted in the presence of added sodium carbonate and/or bicarbonate and potassium rubidium or cesium salts of an organic acid, vide ultra. The sodium carbonate or bicarbonate and the organic salts should be anhydrous although, if hydrated salts are employed where the reaction temperature is relatively low, e.g. 100° to 250° C., the water should be removed, e.g. by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate and/or bicarbonate and potassium, rubidium or cesium organic salt employed should be such that there is at least 1 atom of total alkali metal for each phenol group, regardless of the anion (carbonate, bicarbonate and of the organic acid). Likewise where a halophenol is employed there should be at least one mole of total alkali metal per mole of halophenol.

Preferably, from about 1 to about 1.2 atoms of sodium for each phenol group is used. In another preferred embodiment from 0.001 to about 0.5 atoms of alkali metal (derived from the alkali metal organic salt) is used for each phenol group.

The sodium carbonate or bicarbonate and the potassium organic salt are used such that the ratio of the potassium to sodium therein is from about 0.001 to about 0.5, preferably from about 0.001 to about 0.20 and most preferably from about 0.01 to about 0.1.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesium is a more active metal and potassium is a less active metal so that less cesium and more potassium are used. It is preferred that the ratio of carbonate and bicarbonate anions to the phenolic groups be about 0.5 and 1.0, respectively. However, higher and lower ratios are also possible.

Where a bisphenol and dihalobenzenoid compound are employed, they should be used in substantially equimolar amounts when maximum molecular weight is sought. However a slight excess, up to 5 mole %, of the dihalide or of the diphenol may be employed if desired. An excess of one over the other leads to the production of low molecular weight products which can be desirable when the process is directed to making lower molecular weight PAEK, for example, for block polymer formation.

The reaction may be carried out in the presence of an inert solvent, or partially in the absence of a solvent, or in the absence of solvent.

Preferably a solvent is employed and is an aliphatic or aromatic sulphoxide or sulphone of the formula $$R\text{---}S(O)x \qquad\qquad R'$$

where x is 1 or 2 and R and R' are alkyl or aryl groups and may be the same or different. R and R' may together form a divalent radical. Preferred solvents include dimethyl sulphoxide, dimethyl sulphone, sulpholane (1,1 dioxothiolan), or aromatic sulphones of the formula.

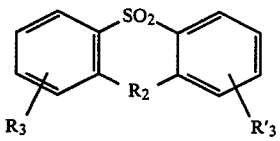

where $R_2$ is a direct link, an oxygen atom or two hydrogen atoms (one attached to each benzene ring) and $R_3$ and $R'_3$, which may be the same or different, are hydrogen atoms or phenyl groups. Examples of such aromatic sulphones include diphenylsulphone, ditolyl sulphone, tolylphenyl sulphone, dibenzothiophen dioxide, phenoxathiin dioxide and 4-phenylsulphonyl biphenyl. Diphenylsulphone is the preferred solvent. Other solvents that may be used include N,N-dimethyl formamide and N-methyl-2-pyrolidone, N,N-dimethylacetamide, and N-cyclohexyl pyrolidone. In another embodiment the reaction is started in a relatively low boiling polar aprotic solvent such as dimethyl formamide, dimethylacetamide, dimethyl sulfoxide, N-methylpyrrolidone, and the like. Heating at reflux results in the formation of low molecular weight product with attendant precipitation. The solvent may be removed and the low molecular weight product may be advanced if desired by solid state polymerization, i.e. by heating to a temperature in the range of from about 200° to about 400° C.; preferably, an inert atmosphere is maintained during this latter step.

The reaction temperature is in the range of from about 100° to about 400° C. and will depend on the nature of the reactants and the solvent, if any, employed. The preferred temperature is above 250° C. The reactions are preferably carried out at ambient pressure. However, higher or lower pressure can also be used. The reaction is generally carried out in an inert atmosphere.

For the production of some poly(aryl ether ketone)s, it may be desirable to commence reaction at one temperature, e.g. between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

As indicated before, the use of the organic salts as part of the base results in increased rates of polymerization. Depending on the particular case the observed increase in the rate can be as high as an order of magnitude, and even higher, when compared to rates that are obtained with the previously known sodium carbonate/potassium fluoride systems.

The poly(aryl ether ketone)s exhibit a reduced viscosity of from about 0.05 to about 5.0, and preferably, from about 0.1 to about 2.0 dl/g as measured in concentrated sulfuric acid (1g/100 ml) at 25° C.

The poly(aryl ether ketone)s of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The poly(aryl ether ketones) of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

CONTROL A

A poly(aryl ether ketone) of the following structure

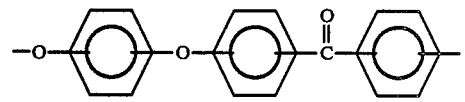

was prepared in the following manner. A 250 ml flask was equipped with a mechanical stainless steel stirrer, nitrogen sparge tube, thermocouple, Dean Stark trap and condenser. The apparatus was charged with 11.01 g (0.100 moles) of hydroquinone, 22.04 g (0.101 moles) of 4,4'-difluorobenzophenone, 10.08 g (0.095 moles) of sodium carbonate, 0.677 g (0.005 moles) of potassium carbonate, and 67.3 g of diphenyl sulfone. The apparatus was evacuated and filled with nitrogen by means of a Firestone valve connected to the top of the condenser. A flow of nitrogen was begun as 35 ml of xylene was added and the content of the flask carefully heated by means of a heating mantle and temperature controller to melt the diphenyl sulfone. The reaction mixture was stirred and heated to 200° C. and held for 1 hour, then held at 250° C. for 15 minutes, and finally at 320° C. for 1.5 hours. The viscous reaction mixture was poured from the reaction flask, allowed to solidify, and ground to a fine powder. The product was refluxed in acetone (700 ml), followed by 5% hydrochloric acid solution (700 ml); and washed with water (2 times using 500 ml of water each time) and acetone (2 times using 500 ml each time). The final product was dried in a vacuum oven at 100° C. for approximately 24 hours. The product had a reduced viscosity of 1.19 dl/g (in concentrated sulfuric acid at 1 g/100 ml at 25° C.).

EXAMPLE I

The procedure of Control A was exactly repeated except that the apparatus was charged with 17.54 g (0.0804 moles) of 4,4'-difluorobenzophenone, 8.81 g (0.080 moles) of hydroquinone, 8.22 g (0.0775 moles) of sodium carbonate, 0.801 g (0.0082 moles) of potassium acetate and 69 g of diphenyl sulfone. The reaction time and reduced viscosity of the resultant polymer are listed in Table I.

EXAMPLE II

Example I was repeated with the reaction time shortened to 10 minutes at 320° C. The results are listed in Table I.

EXAMPLE III

Example II was repeated with the reaction time shortened to 7 minutes at 320° C. The results are listed in Table I.

EXAMPLE IV

The procedure of Control A was exactly repeated except that the apparatus was charged with 16.45 g (0.0754 moles) of 4,4-difluorobenzophenone, 8.26 g (0.0750 moles) of hydroquinone, 7.70 g (0.0727 moles) of sodium carbonate, 0.705 g (0.0038 moles) of potassium oxalate and 65 g of diphenyl sulphone. The reaction time and reduced viscosity of the resultant polymer are listed in Table I.

EXAMPLE V

Example IV was repeated with the reaction time lengthened to 210 minutes at a temperature of 320° C. The results are listed in Table I.

EXAMPLE VI

The procedure of control A was exactly repeated except that the apparatus was charged with 17.54 g (0.0804 moles) of 4,4-difluorobenzophenone, 8.81 g (0.0800 moles) of hydroquinone, 8.48 g (0.0800 moles) of sodium carbonate, 1.84 g (0.0100 moles) of potassium oxalate and 69 g of diphenyl sulphone. The reaction time and reduced viscosity of the resultant polymer are listed in Table I.

EXAMPLE VII

The procedure of control A was exactly repeated except that the apparatus was charged with 17.54 g (0.0804 moles) of 4,4-difluorobenzophenone, 8.81 g (0.0800 moles) of hydroquinone, 8.48 g (0.0800 moles) of sodium carbonate, 3.68 g (0.0200 moles) of potassium oxalate and 69 g of diphenyl sulphone. The reaction time and reduced viscosity of the resultant polymer are listed in Table I.

TABLE I

|  | Potassium Salt | Ratio of Sodium/ Potassium | Reaction time at 320° C. (min) | Reduced viscosity$^a$ (dl/g) |
| --- | --- | --- | --- | --- |
| Control A | $K_2CO_3$ | 95/5 | 90 | 1.19 |
| Example I | $CH_3CO_2K$ | 95/5 | 15 | 1.31 |
| Example II | $CH_3CO_2K$ | 95/5 | 10 | 0.91 |
| Example III | $CH_3CO_2K$ | 95/5 | 7 | 1.40 |
| Example IV | $K_2C_2O_4.H_2O$ | 95/5 | 125 | 0.99 |
| Example V | $K_2C_2O_4.H_2O$ | 95/5 | 210 | 1.11 |
| Example VI | $K_2C_2O_4.H_2O$ | 89/11 | 50 | 0.66 |
| Example VII | $K_2C_2O_4.H_2O$ | 80/20 | 145 | 0.97 |

$^a$measurement performed as described in Control A.

What is claimed is:

1. An improved process for preparing poly(aryl ether ketone)s by the reaction of a mixture of at least one bisphenol and at least one dihalobenzenoid compound, and/or a halophenol, wherein the improvement comprises providing to the reaction a base which is a combination of sodium carbonate and/or bicarbonate and a potassium, rubidium, or cesium salt of an organic acid or combinations of various organic salts thereof.

2. A process as defined in claim 1 wherein the salt of the organic acid is selected from the potassium, rubidium, or cesium salts of (a) aliphatic linear or branched acids, (b) halo-substituted aliphatic acids, (c) aromatic mono- or polynuclear acids, (d) branched or linear araliphatic acids, (e) heterocyclic carboxylic acids, (f) aliphatic, aromatic, or heterocyclic dicarboxylic acids, (g) aliphatic, aromatic, or heterocyclic sulfonic or sulfinic acids, or (h) aliphatic, aromatic, or heterocyclic phosphonic or phosphinic acids.

3. A process as defined in claim 2 wherein the salts of (a) are selected from the salts of formic, acetic, propionic, butyric, isobutyric, pentanoic, hexanoic, heptanoic, octanoic, nonanoic, decanoic, 2-methyl-butyric, 3,4-dimethyl pentanoic, 4,4-dimethyl hexanoic, 2-ethyl heptanoic, or 3-propyl-5,6-dimethyl nonanoic acids.

4. A process as defined in claim 2 wherein the salts of (b) are selected from the salts of monochloro-, dichloro- and trichloroacetic, 2-chloropropionic, 3,5-dichloro-heptanoic, bromoacetic, 3-fluorobutyric, and 3,3,3-trichloropropionic acids.

5. A process as defined in claim 2 wherein the mononuclear salts of (c) are selected from the salts of benzoic, toluic, 3,4-dimethylbenzoic, 2-chlorobenzoic, 3,4-dichloro-benzoic, 2-bromobenzoic, or 2-chloro-4-methylbenzoic acids.

6. A process as defined in claim 2 wherein the polynuclear salts of (c) are selected from the salts of naphthalene and alkyl substituted naphthalene acids.

7. A process as defined in claim 6 wherein the naphthalene and alkyl substituted naphthalene acids are selected from 3-methyl-naphthalene-1-carboxylic acid, naphthalene-1-carboxylic acid, naphthalene-2-carboxylic acid, 4-methyl-naphthalene-1-carboxylic acid, 1-methyl-naphthalene-7-carboxylic acid, or 6-ethyl naphthalene-2-carboxylic acid.

8. A process as defined in claim 2 wherein the polynuclear salts of (c) are selected from the salts of halo-substituted naphthalene carboxylic acids.

9. A process as defined in claim 8 wherein the halo-substituted naphthalene acids are selected from 4-chloro naphthalene-2-carboxylic acid, 3-chloro naphthalene-2-carboxylic acid, 3-chloro naphthalene-1-carboxylic acid, or 6-bromo naphthalene-2-carboxylic acid.

10. A process as defined in claim 2 wherein the polynuclear salts of (c) are selected from the salts of phenanthrene and anthracene carboxylic acids.

11. A process as defined in claim 2 wherein the salts of (d) are selected from the salts of phenylacetic, diphenyl acetic, 1-naphthyl acetic, 2-naphthyl-acetic, 4-chlorophenyl acetic, 4-methylphenyl acetic, 3-bromo-1-naphthyl acetic, 4-chloro-2-naphthyl-acetic, 3-(4-ethylphenyl)butyric, 3-methyl-4-(2-ethyl-4-chlorophenyl)butyric, 3-phenyl-hexanoic, or 7-phenylnonanoic acids.

12. A process as defined in claim 2 wherein the salts of (e) are selected from the salts of furane-2-carboxylic, furane-3-carboxylic, thiophene-2-carboxylic, thiophene-3-carboxylic, pyridine, quinoline, or isoquinoline carboxylic acids.

13. A process as defined in claim 2 wherein the salts of heterocyclic carboxylic acids of (e) are the salts of alkyl, aryl and halo substituted heterocyclic carboxylic acids.

14. A process as defined in claim 13 wherein the acids are selected from 2-methylfurane-3-carboxylic, 4-chloro-pyridine-2-carboxylic, 2-methyl-4-oxazole carboxylic, or 2-propyl-pyrazine-3-carboxylic acids.

15. A process as defined in claim 2 where the salts of (f) are selected from the salts of oxalic, malonic, succinic, adipic, suberic, azelaic, α-bromo-glutaric, β,β'-dimethyl-glutaric, α,α'-dichlorosuberic, maleic or fumaric acids.

16. A process as defined in claim 2 wherein the salts of (f) are selected from the salts of phthalic, isophthalic, terephthalic, naphthalene-1,2-dicarboxylic, naphthalene-2,3-dicarboxylic, naphthalene-1,5-; 1-6-; 1,7-; 1,8-;

2,4-; 2,5-; and 2,6-dicarboxylic, pyridine-2,3-dicarboxylic, or furane-2,3-dicarboxylic acids.

17. A process as defined in claim 2 wherein the salts of (f) are selected from the salts of heterocyclic dicarboxylic acids.

18. A process as defined in claim 2 wherein the sulfonic acid salts of (g) are selected from the salts of methane sulfonic, ethane sulfonic, propane sulfonic, benzene sulfonic, 1-naphthalene sulfonic, 2-naphthalene sulfonic, 1,8-naphthalene disulfonic, 2,6-naphthalene disulfonic, p-toluene sulfonic, 3,4-dichloro-benzene sulfonic, quinoline-2-sulfonic, 4-pyridine sulfonic, 2-thiophene sulfonic, 3-thiophene sulfonic, or 3-propyl-2-furane-sulfonic acids.

19. A process as defined in claim 2 wherein the sulfinic acid salts of (g) are selected from the salts of benzene sulfinic, 1-naphthalene sulfinic, 4-methyl-benzene sulfinic, or 3-methyl-2-furane sulfinic acids.

20. A process as defined in claim 2 wherein the phosphonic acid salts of (h) are selected from the salts of methane phosphonic, ethane phosphonic, benzene phosphonic, 1-naphthalene phosphonic, 2-naphthalene-phosphonic, 1,8-naphthalene diphosphonic, 4-ethyl-benzene phosphonic, 3,4-dichloro-benzene phosphonic, 3,4-dibromobenzene phosphonic, 3-chloro-4-methyl benzene phosphonic, 6-chloro-1-naphthalene phosphonic, 2-quinoline-phosphonic, 2-thiophene phosphonic, 3-thiophene phosphonic, or 3-propyl-2-furane phosphonic acids.

21. A process as defined in claim 2 wherein the phosphinic acid salts of (h) are selected from the salts of benzene phosphinic, 1-naphthalene-phosphinic, 4-methyl-benzene phosphinic, 3-thiophene phosphinic or 3-chloro-2-furane phosphinic acids.

22. A process as defined in claim 1 wherein the base is selected from sodium carbonate and/or bicarbonate and potassium formate, acetate, propionate, oxalate, benzoate, benzene sulfonate, or p-toluene sulfonate.

* * * * *